United States Patent
Li et al.

(10) Patent No.: US 9,503,529 B2
(45) Date of Patent: Nov. 22, 2016

(54) SYSTEM AND METHOD TO TRANSPORT HTTP OVER XMPP

(75) Inventors: Li Li, Bridgewater, NJ (US); Wu Chou, Basking Ridge, NJ (US)

(73) Assignee: Avaya Inc., Basking Ridge, NJ (US)

(*) Notice: Subject to any disclaimer, the term of this patent is extended or adjusted under 35 U.S.C. 154(b) by 1076 days.

(21) Appl. No.: 13/239,811

(22) Filed: Sep. 22, 2011

(65) Prior Publication Data

US 2012/0254362 A1 Oct. 4, 2012

Related U.S. Application Data

(60) Provisional application No. 61/471,507, filed on Apr. 4, 2011.

(51) Int. Cl.
| | |
|---|---|
| *H04L 29/08* | (2006.01) |
| *H04W 4/02* | (2009.01) |
| *H04W 4/12* | (2009.01) |
| *H04L 29/06* | (2006.01) |
| *H04W 12/02* | (2009.01) |

(52) U.S. Cl.
CPC ............ *H04L 67/16* (2013.01); *H04L 67/02* (2013.01); *H04W 4/025* (2013.01); *H04W 4/12* (2013.01); *H04L 63/0407* (2013.01); *H04W 12/02* (2013.01)

(58) Field of Classification Search
USPC ...................................................... 709/206
See application file for complete search history.

(56) References Cited

U.S. PATENT DOCUMENTS

| | | | |
|---|---|---|---|
| 2005/0120292 A1 | 6/2005 | Suzuki | |
| 2005/0276397 A1 | 12/2005 | Hiatt et al. | |
| 2006/0026290 A1 | 2/2006 | Pulito et al. | |
| 2006/0271696 A1 | 11/2006 | Chen et al. | |
| 2007/0005725 A1 | 1/2007 | Morris | |
| 2008/0163312 A1* | 7/2008 | Faust et al. | 725/93 |
| 2008/0263049 A1 | 10/2008 | Hind et al. | |
| 2009/0157861 A1 | 6/2009 | Kakuta et al. | |
| 2010/0121971 A1 | 5/2010 | Shao et al. | |
| 2010/0135278 A1* | 6/2010 | Dingler et al. | 370/352 |
| 2010/0146132 A1* | 6/2010 | Morris | 709/229 |
| 2010/0174789 A1 | 7/2010 | Pena et al. | |
| 2010/0177812 A1 | 7/2010 | O'Shaughnessy et al. | |
| 2011/0208799 A1 | 8/2011 | Labrogere et al. | |
| 2011/0302316 A1 | 12/2011 | Chou et al. | |
| 2012/0084356 A1 | 4/2012 | Ferdi | |
| 2012/0254407 A1 | 10/2012 | Li et al. | |
| 2012/0297457 A1 | 11/2012 | Schulte et al. | |

OTHER PUBLICATIONS

"HTTP over XMPP transport" version 0.0.7 Peter Waher, Jul. 9, 2013.*
"SOAP over XMPP", version 1.0, Forno et al. Dec. 14, 2005.*

(Continued)

*Primary Examiner* — Angela Nguyen

(57) ABSTRACT

Method to transport HTPP over XMPP, including: forming a first two-level URI template to identify web resources accessible by use of HTTP in an XMPP network, wherein a first level is XMPP-formatted and a second level is HTTP-formatted; binding HTTP to XMPP <message> and <iq> stanzas; transmitting the HTTP messages in those stanzas; receiving a HTTP messages in those stanzas; and a XMPP mechanism to discover if an XMPP entity supports transporting HTTP over XMPP.

25 Claims, 7 Drawing Sheets

(56) References Cited

OTHER PUBLICATIONS

Lauren Lefort, "Review of semantic enablement techniques used in geospatial and semantic standards for legacy and opportunistic mashups", 2009, Austrialasian Ontologies Workshop, pp. 17-26 (10 pages total).
Saeed Aghaee, et al., "Mashup Development with HTML5", Dec. 1, 2010, Mashup '10 ACM, (8 pages total).
Virpi Roto et al., "Navigating in a Mobile XHTML Application", Apr. 5, 2003, New Horizons, vol. 5, Issue 1, pp. 329-336 (8 pages total).
Schulte et al., Support from Provisional U.S. Appl. No. 61/413,677 p. 1-2.
Li Li, et al., "U.S. Appl. No. 13/239,766 Office Action Jul. 25, 2014", Publisher USPTO Published in: US.
Li Li, et al., "U.S. Appl. No. 13/239,766 Office Action Feb. 12, 2014", Publisher USPTO Published in: US.
Li Li, et al., "U.S. Appl. No. 13/239,766 Office Action Jul. 26, 2013", Publisher USPTO Published in: US.
Joseph M. Cousins; Non-Final Office Action; U.S. Appl. No. 13/239,766; Jan. 26, 2015; United States Patent and Trademark Office; Alexandria, Virginia.
Joseph M. Cousins; Final Office Action; U.S. Appl. No. 13/239,766; Apr. 28, 2015; United States Patent and Trademark Office; Alexandria, Virginia.
Joseph M. Cousins; Non-Final Office Action; U.S. Appl. No. 13/239,766; Dec. 2, 2015; United States Patent and Trademark Office; Alexandria, Virginia.
Related U.S. Appl. No. 15/014,299, entitled "System and Method to Transport HTTP Over XMPP," filed Feb. 3, 2016 by Li Li.
Nguyen, Angela; Office Action; U.S. Appl. No. 15/014,299; Jun. 3, 2016; United States Patent and Trademark Office; Alexandria, Virginia; United States.
Cousins, Joseph M.; Final Office Action; U.S. Appl. No. 13/239,766; Jun. 16, 2016; United States Patent and Trademark Office; Alexandria, Virginia.

* cited by examiner

FIG. 1

{operation} {path} {version}
Authorization {token}
x-tid: {string}

{form}

{status} {reason} { version}
Authorization: {token}
x-tid: {string}

{form} | {html}

700

SYSTEM AND METHOD TO TRANSPORT HTTP OVER XMPP

CROSS-REFERENCE TO RELATED APPLICATIONS

This application claims the benefit of U.S. Provisional Patent Application Ser. No. 61/471,507, filed on Apr. 4, 2011, the content of which is hereby incorporated by reference in its entirety.

BACKGROUND

Field of the Invention

Embodiments of the present invention generally relate to hyperlink presence. More specifically, embodiments of the present invention relate to a system and method for monitoring presence information of a hyperlink, and rendering the presence information to a user.

Description of the Related Art

An architectural style that underlies the Web is REpresentational State Transfer ("REST"). A web service that is compatible with REST is said to be "RESTful." REST provides resource management and promotes architectural choices that include: 1) Addressability—each resource can be addressed by Uniform Resource Identifier ("URI"); 2) Connectedness—resources are linked to provide navigations; 3) Uniform Interface—all resources support a subset of a uniform interface between components, namely GET, PUT, DELETE and POST; 4) Statelessness—all requests to a resource contain all of information necessary to process the requests, and the servers do not need to keep any context about the requests; and 5) Layering: intermediate proxies between clients and servers can be used to cache data for efficiency. Because of its relative simplicity, compared to SOAP-based web services, REST web service paradigm is gaining popularity for use in implementing mobile device applications. Researchers have also compared the performance of the same SOAP and REST services implemented on mobile devices. REST was found to be more suitable to mobile devices since REST required less processing time and memory.

Constrained REST Environments is protocol that restricts HTTP when executing on low-end devices, such as 8-bit microcontrollers with up to 12 KB of memory. The Constrained REST Environments protocol binds HTTP to UDP for asynchronous messages. However, this approach is not suitable for mobile environments, because mobile phones do not have reachable IP addresses.

Researchers in the field have proposed using REST web service framework for a number of applications, such as: to implement mobile commerce spaces; to support services on mobile computing units in connection with semantic web technology; to expose IMS capabilities to Web 2.0 applications; to support person-to-person communication and collaborations over WiFi and 3G networks; and to provide a web service provisioning system having much lower overhead than a SOAP counterpart.

Researchers have also presented a REST architecture to render web interfaces on mobile devices in which the REST protocol is used to synchronize between applications.

Researchers have described an approach to adapt resource-oriented service framework to automatically control robots for industrial automation tasks. This approach uses a special protocol called MRROR to handle events. Performance of this framework was evaluated under three physical networks: wireless LAN, Bluetooth and ZigBee. The results showed that the REST framework had a lower overhead than SOAP-based Devices Profile for Web Services ("DPWS").

Wireless Application Protocol ("WAP") is a suite of protocols to connect wireless mobile phones to the Web. The typical WAP architecture includes a Content Server, a WAP Gateway, and mobile devices. When requested by the Content Server, the WAP Gateway uses Wireless Session Protocol ("WSP"), which is a binary version of HTTP, to transfer encoded Wireless Markup Language ("WML") content to the mobile devices. However, modern smart phones rarely support WAP because they can interpret HTML directly.

None of the research discussed above has studied how to compact HTTP for mobile devices and how to expand HTTP to connect phones with each other to enable a collaborative endpoint network in a mobile phone environment and to link functions on the phones with enterprise applications.

Extensible Messaging and Presence Protocol ("XMPP"), described by Internet Engineering Task Force (IETF) document numbers RFC-3920 and RFC-3921, supports efficient bidirectional XML streams between XMPP servers using two TCP/IP connections. This creates bidirectional notification flows between XMPP servers. However, XMPP protocol is not based on REST web services. Although BOSH (XEP-0124) uses HTTP long-polling to emulate bidirectional TCP streams, the established streams are not web resources that can be manipulated by HTTP. XMPP also supports a publish/subscribe extension (XEP-0060) to allow XMPP entities to subscribe and publish events to topics. But these subscriptions are unidirectional and not web resources.

Many mobile devices, such as smart phones, have the ability to host REST services so its functions and states can be controlled and observed in real-time. However, these devices do not have an IP address that is reachable from outside a cellular network, therefore they cannot accept outside HTTP requests after they connect to the cellular network. Meanwhile, these mobile devices can connect to XMPP servers and clients without a problem. However, REST services on devices are not usable over an XMPP network because there is no defined way to transport HTTP messages over XMPP.

Web browsers are becoming peer-to-peer communication endpoints, promoted by groups such as the W3C Web Real-Time Communication working group. In the future, a web browser may host REST services that another browser can invoke. Several HTTP/XMPP gateway technologies have been developed to allow web browsers to connect to XMPP servers and exchange XMPP messages. But because there is no defined way to transport HTTP over XMPP, the REST services in web browsers are not usable over the XMPP network.

XMPP has been used in real-time communication (e.g., Jingle in Google Talk) and collaborations (e.g., Cisco Jabber for unified communications ("UC")). However, current XMPP networks do not expose web resources such that the web resources can be manipulated by HTTP. As communication and collaboration converge with the Web, there is a need to manipulate XMPP networks resources as web resources by use of HTTP.

Thus there is a need to exchange HTTP messages in a XMPP network, and a need for a mechanism to expose functions in a XMPP network as web resources that can be manipulated by HTTP.

SUMMARY

As mobile phones become more and more advanced, they are replacing other devices, such as personal digital assistants ("PDAs") and notebook computers, as the next-generation PDA. Compared to other computing devices, the mobile phones offer a desirable combination of telephony functions (e.g., making and receiving phone calls), sensory functions (e.g., sound, camera, camcorder, location, acceleration, temperature, etc.) and communication networks (3G, WiFi, Bluetooth, WiMAX, etc.). More and more applications are being designed for mobile phones to take advantage of these capabilities, as evidenced by the popularity of iPhone and Android applications in the Apple App Store.

Embodiments in accordance with the present invention may include a web service approach to enable collaborative endpoint network for mobile phones and to expose their functions on mobile phones as REST web services, such that applications running remotely can monitor and control them in a near real-time manner. Collaborative endpoint network is an emerging area with applications in intelligent home network, etc. There are many motivating use cases to extend the collaborative endpoint network to mobile phones as a surveillance device to monitor and remind patients of their treatment, as well as find and locate medical professionals to treat them. A travel application is to use mobile phones as a virtual tour guide, and push relevant multimedia content to a visitor as he/she moves around a tourism site. Mobile phones are also an ideal device to keep track of traffic flows when the speed of many drivers can be obtained and aggregated automatically. All these applications require the ability to monitor and control one or more functions on the phone in near-real time, as these functions, such as location, may change frequently and in-time responses are needed.

An efficient approach to supporting these applications is to expose the fundamental functions on the phones as REST web services and make mobile phones as web service endpoints, so that services on mobile phones can be invoked and composed in different ways by different applications. This approach eliminates the need for each application to duplicate the same function. Making a phone into a web service endpoint enables the applications to interact with the phones in heterogeneous mobile environments, as web service is independent of transport protocols and programming languages. REST web service is easy to extend as it supports dynamic discovery through links. For example, to add a second camera on the phone into the services, we just need to implement a new camera resource and link it the main resource.

Two types of web services are SOAP-based and REST-based. Known implementations have chosen REST-based web services for mobile phones because of simplicity and close relationship with the architecture of the Web. However, the HTTP 1.1 protocol used in current REST web suffers several shortcomings. First, the HTTP 1.1 messages can be complex and large, while some features of HTTP 1.1 are never used in mobile phones. Second, HTTP 1.1 should be expanded to support multiple transport protocol bindings besides TCP/IP, in order to support REST services in heterogeneous environments. Therefore, a need exists to provide both compaction and expansion of the HTTP 1.1 protocol in order to support current REST services in a mobile phone environment. To address these issues, embodiments in accordance with the present invention construct a "Compact HTTP" protocol, which includes a small subset of HTTP 1.1 that keeps only the elements of HTTP 1.1 that are used to enable a collaborative endpoint network of mobile phones.

Embodiments in accordance with the present invention describe how Compact HTTP can be bound to multiple messaging protocols, in particular to XMPP and Short Message Service ("SMS"). These protocol bindings introduce asynchrony into REST to support event-driven REST web services on mobile phones. Furthermore, HTTP over XMPP in accordance with embodiments of the present invention introduces hyperlink presence into REST to mitigate the broken link issue that is important for mobile phones. Embodiments in accordance with the present invention also provide a security profile that is useful to afford flexible and quick setup of security contexts between services and clients.

Based on this protocol, embodiments in accordance with the present invention provide a lightweight web services framework on an Android mobile phone. Within this framework, a plurality of resources, including sound, camera, camcorder, location, power, motion, scheduler, and telephony manager are implemented as secured REST web services. The collaborative endpoint network framework also supports web storage (e.g., Google sites, YouTube, etc.) in order to upload recorded media for instant sharing and collaboration.

Embodiments in accordance with the present invention provide a method to transport HTPP over XMPP, comprising: forming a first two-level URI template to identify web resources accessible by use of HTTP in an XMPP network, wherein a first level is XMPP-formatted and a second level is HTTP-formatted; binding HTTP to XMPP <message> and <iq> stanzas; transmitting the first<message> and <iq> stanzas; receiving a HTTP message in the <message> and <iq> stanzas; and discovering, by use of an XMPP mechanism, whether an XMPP entity supports the transport of HTTP over XMPP.

Optionally, embodiments in accordance with the present invention may provide a method wherein dereferencing the second two-level URI further comprises: extracting an XMPP JID from the second two-level URI; assigning the XMPP JID to a HTTP Host header field; extracting a HTTP Request-URI field from a portion of the second two-level URI following a predetermined delimiter; activating an XMPP connection; transmitting an XMPP IQ stanza to a destination indicated by the JID, wherein the XMPP IQ stanza comprises a HTTP GET message to a URI location indicated by the HTTP Request-URI; receiving a result IQ stanza from the destination indicated by the JID; and extracting a response from a resulting IQ stanza.

Embodiments in accordance with the present invention provide a system to transport HTPP over XMPP, comprising: a template formation module configured to form a first two-level URI template to identify web resources accessible by use of HTTP in an XMPP network, wherein a first level is XMPP-formatted and a second level is HTTP-formatted; a binding module configured to bind HTTP to XMPP in the first two-level URI template; a transmitter configured to transmit the first two-level URI template to a destination; a receiver configured to receive a second two-level URI template from the destination; and a dereferencing module configured to dereference the second two-level URI.

Optionally, embodiments in accordance with the present invention may provide a system wherein the dereferencing module further comprises: an XMPP JID extraction module configured to extract an XMPP JID from the second two-level URI; an assignment module configured to assign the XMPP JID to a HTTP Host header field; an extraction module configured to extract an HTTP Request-URI field from a portion of the second two-level URI following a predetermined delimiter; an activation module configured to activate an XMPP connection; a transmitted configured to transmit an XMPP IQ stanza to a destination indicated by the JID, wherein the XMPP IQ stanza comprises a HTTP GET message to a URI location indicated by the HTTP Request-URI; a receiver configured to receive a result IQ stanza from the destination indicated by the JID; and an extraction module configured to extract a response from a resulting IQ stanza.

BRIEF DESCRIPTION OF THE DRAWINGS

So the manner in which the above recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments encompassed within the scope of the present invention, and, therefore, are not to be considered limiting, for the present invention may admit to other equally effective embodiments, wherein:

FIG. 1 is a message template pair, for a Compact HTTP request and response in accordance with an embodiment of the present invention;

Figure 2:
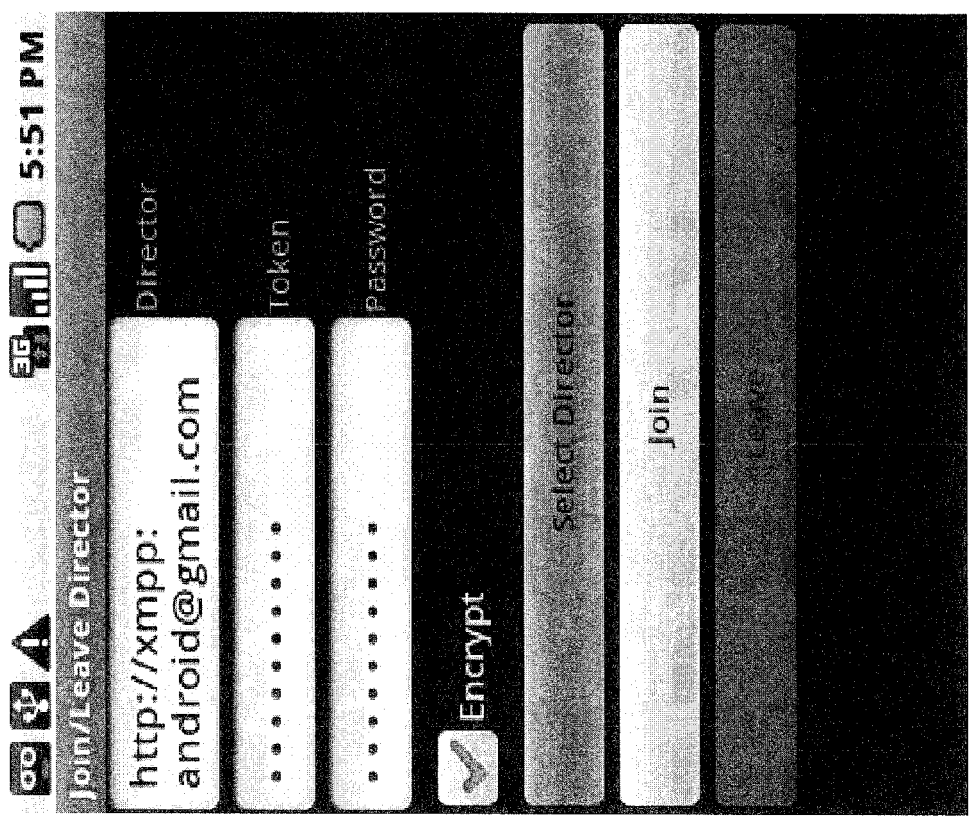
FIG. 2 illustrates a phone interface for an operator to carry out steps of a process in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines.

DETAILED DESCRIPTION

Embodiments of the present invention generally relate to hyperlink presence. More specifically, embodiments of the present invention relate to a system and method based upon Representational State Transfer for monitoring presence information of a hyperlink, and rendering the presence information to a user.

As used herein in connection with embodiments of the present invention, the term "REST" refers to REpresentational State Transfer web services, as described below in further detail.

As used herein in connection with embodiments of the present invention, the term "RESTful" refers to a web service that is compatible with REST.

As used herein in connection with embodiments of the present invention, the term "R-Event" refers to a RESTful web service framework, and in particular to a RESTful web service framework which is usable to implement distributed event-based systems.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein in connection with embodiments of the present invention, the term "resource" refers to a special component that is addressable by URI and supports a uniform interface as defined by REST. Any information that can be named can be a resource: a document or image, a temporal service (e.g. "today's weather in Los Angeles"), a collection of other resources, a non-virtual object (e.g. a person), and so on. In other words, any concept that might be the target of an author's hypertext reference fits within the definition of a resource. A resource is a conceptual mapping to a set of entities, not the entity that corresponds to the mapping at any particular point in time.

Compact HTTP

HTTP 1.1 has a set of very powerful features that can be too expensive to implement and support on resource-constrained mobile devices. Even though it is possible to run an HTTP 1.1 server on Android mobile phones, many of its features may never be utilized. Therefore, there is a need to develop a lightweight compact protocol, "Compact HTTP," for mobile phones. Compact HTTP includes a subset of the HTTP 1.1 protocol, but yet is still useful to provide the endpoint network and collaborative applications of mobile phones. Protocol compaction as described herein is particularly useful for lightweight or otherwise less powerful devices.

For more powerful devices, either presently or as devices become more powerful in the future, compaction is less useful. For this reason, examples presented herein may illustrate HTTP messages in plain text, rather than binary, because the compact subset of HTTP 1.1 may grow to support further extensions.

Message Templates

To reach a compacted subset, embodiments in accordance with the present invention start from an empty feature set and add features to it as needed until the desired services are covered. For example, a Compact HTTP request and response template that follows HTTP 1.1 is shown in FIG. 1. All of the variables illustrated in FIG. 1, including "{operation}," "{path}," "{version}," "{status}," and "{reason}" are defined in HTTP 1.1. For Compact HTTP, the version is HTTP 1.1c. "{form}" is defined by HTML 4 (also known as HTML 1999), whose media type is "application/x-www-form-urlencoded." The differences between Compact HTTP and HTTP 1.1 are described below.

"Authorization" contains the access token for the message. In HTTP 1.1, "Authorization" is a request header. Embodiments in accordance with the present invention extend "Authorization" to responses because responses may be sent in a different connection. Therefore, the client needs to authorize a response before taking any action (e.g., to update a user interface).

"x-tid" is a new header to HTTP 1.1 that clients may use to correlate asynchronous responses and events to requests. A value for "x-tid" is set in a request and echoed in the responses.

The templates shown in FIG. 1 by design omit some headers considered important for REST services, such as the ETag response header. This is because the resources of the mobile devices that Compact HTTP is designed to run on tend to have small representations that can be updated and transmitted without checking the versions. A representation of a resource is a stream of bytes returned by the resource. Example representations include a HTML document, JPEG or XML document. In web architecture, a user agent (e.g., a web browser) may cache the representation of a resource to reduce latency and network traffic. When the user agent requests the latest version of the representation, it may use ETag, in combination with other HTTP headers, to ask the server to send the representation only if it is different from what has been cached. In embodiments in accordance with the present invention, such checking is not used. The representation may be, for instance, as measured by the maximum size of an HTTP form. Embodiments in accordance with the present invention also omit content negotiation headers in favor of using URI.

Message Exchange Patterns

Typical HTTP messages follow a request-response pattern. Services following this pattern are atomic as the service is complete once the response is sent. However, many services on the mobile phones are multi-step instead of atomic. For example, to control a camera to take a picture involves the following steps: 1) adjust focus; 2) take shot; 3) upload picture to a web site. Modeling this type of services as atomic would not be a scalable approach because: 1) it would make the service stateful, which violates the REST statelessness principle; and 2) it makes a client less responsive to service state changes and it is much more expensive to recover from faults.

Embodiments in accordance with the present invention model the multi-step services as one request followed by multiple responses, in which intermediate responses indicate service progression while the final one indicates service completion. To separate them, the status for the intermediate responses should be 202 Accepted or 206 Partial Content, while the final response should be 200 OK or 201 Created. Status 206 is used only with GET in HTTP 1.1, and here we extend it to any request to convey the current service state as partial content. All asynchronous responses are correlated to its request by x-tid for both atomic and multi-step services.

Another type of message exchange pattern is event subscription and notifications. For example, a client can subscribe to a phone's location tracking service to receive notifications about location changes of the phone. In this pattern, a subscription (sent by a client as PUT) is followed by unknown number of notifications (sent by the service as POST). A client should be able to tell which notifications are from which subscriptions, so that the client can adjust the subscriptions, e.g. cancel, etc. To support this feature, the x-tid of notifications would echo the x-tid of the subscription request.

Design Patterns

The Compact HTTP does not specify how to design the resources to support these message exchange patterns. Embodiments in accordance with the present invention follow the REST service design patterns, including session, event subscription, multi-resource and multi-state, which are common in real-time communication services.

Compact HTTP Bindings

In conventional REST web services, there is a basic and implicit assumption that a HTTP server has a public IP address. However, this is not possible in mobile environment, because a mobile phone is typically behind its provider's NAT gateway and its private IP address is not reachable from outside. Enterprise applications that control and monitor phones are also behind corporate firewalls. This creates difficulty for many real-time applications in which two-way messaging is required. On the other hand, many 3G mobile phones can join different communication networks over different protocols such that they are reachable without IP addresses. Instead of IP address, a phone can be addressed by a phone number (e.g., SMS protocol), an email address (e.g., SMTP protocol) or Jabber ID ("JID") (e.g., XMPP).

Therefore, to support REST services in these heterogeneous environments, it is advantageous to decouple HTTP from TCP/IP. In addition to TCP/IP, it is both convenient and advantageous to treat these messaging protocols as "transport" for HTTP. This approach makes the REST services invariant to the protocol changes as the mobile phone connects to different networks. This allows embodiments in accordance with the present invention to keep the same services while optimizing their performance over available networks and protocols. For example, time sensitive messages may be transmitted over TCP/IP or XMPP, and non-critical messages over SMS or SMTP. Furthermore, HTTP over XMPP can bring presence information into REST architecture. Presence information is known as a status indicator that conveys ability and willingness of (in this situation) a hyperlinked resource to respond to a communication. In particular, we can assign presence to hyperlinks to address the issue of broken links in the Web.

A tenet of the web service paradigm is that web services should function independently of the transport protocol used for providing the web service. Separation of protocol messages and transport is a consequence of that tenet. SOAP based web services embrace this approach by defining SOAP bindings to HTTP (see, e.g., WSDL 2001), to XMPP (see, e.g., SOAP/XMPP 2005), and to JMS (see, e.g., SOAP/JMS 2009). However, HTTP presently has bindings only to TCP/IP and UDP. Embodiments in accordance with the present invention extend HTTP bindings with other message transport protocols by developing the process and modular components to extend the HTTP bindings. In particular, the binding of HTTP with XMPP is discussed below in detail.

URI Scheme

In REST services, any resource must have a URI that identifies where the resource is and how to contact it. Because we want to bind HTTP to different transport protocols, we adopt a two-level URI scheme according to RFC-3986, where the first level URI identifies the HTTP information and the second level URI identifies the transport information:

$$uri\_1 = http://\{uri\_2\}/...$$
$$\{uri\_2\} = URI$$

For example, the format to address a resource x with HTTP over SMS to a phone number is:
 http://sms:5555/x Or alternatively, the format to address a resource x with HTTP through a SMTP gateway is:
 http://smtp:5555@example.com/x To address the same resource with HTTP over XMPP, the format is:

http://xmpp:joe@example.com/x

If the phone has an IP address, the URI for the resource would be:

http://123.4.5.6/x

To communicate with a resource with uri_1, a client first establishes a communication channel according to uri_2 and then transmits HTTP messages over the communication channel. This process is elaborated in the next section using XMPP as an example.

XMPP

XMPP architecture comprises XMPP servers and clients. To exchange messages, clients establish a TCP/IP connection to the same or federated XMPP servers. Federated servers are a network of XMPP servers connected by the XMPP server-server protocol. Open XMPP servers, such as Google Talk, provide users free accounts with federated identities. For instance, a user can use a valid GMail account to login to the Google Talk server.

To connect to a XMPP server, a XMPP client typically needs to know the following information: 1) XMPP host and port (e.g., talk.google.com:5222); and 2) XMPP Service (e.g., gmail.com). This information is not included in URI scheme because the URI scheme is independent of which XMPP server is used. Therefore, the host/port/service information can be saved in a configuration file associated with a user. Once the user logs into the XMPP server, the connection identified by the saved host/port/service information is used to transmit all HTTP messages.

Chat service is among the base protocols of XMPP and most XMPP clients support this feature. Therefore, embodiments in accordance with the present invention transmit Compact HTTP messages as chat over XMPP. The template for HTTP request and response over XMPP is:

```
<message
    from='{from_jid}' to='{to_jid}'>
    <body>
        {Compact HTTP message}
    </body>
</message>
```

Hyperlink Presence

While browsing the Web, a user may encounter a broken hyperlink, which may occur in certain circumstances when the resource that embeds the links is not aware of the linked resource. When the web server shuts down, or the linked resources that are hosted on the web server are moved or deleted, the link becomes broken. In this situation, it is difficult for the client to know when the link will be restored unless the client polls the server constantly, which creates unnecessary network traffic.

In accordance with embodiments of the present invention, HTTP over XMPP provides a solution to the problem of broken hyperlinks by using presence services provided by the XMPP layer. If a XMPP client listens for presence updates from a JID address, it can assign presence to a hyperlink containing that address in near real-time. For example, to assign presence to a hyperlink: http://xmpp:someone@gmail.com/x, the client just needs to monitor the presence of someone@gmail.com. By knowing the link presence, the client can avoid fetching or polling the broken links all together. The presence services also gives the REST services an ability to change their presence, for example in case of temporary maintenance, while keeping the clients informed in a timely fashion.

SMS

SMS is a very common feature in most mobile phones. There are several ways to send and receive SMS messages depending on the networks. In cellular networks that provide SMS, two phones can exchange SMS directly. Outside the cellular networks, a client may use a SMS gateway that exposes particular protocols, such as SMTP to send and IMAP to retrieve SMS messages. For example, this approach is available in the T-Mobile™ network, which assigns each G1 phone an email address that ties with its number, for example: {number}@tmobile.net.

To bind to SMS, the Compact HTTP messages are contained in the User Data ("UD") segment of the SMS Protocol Description Unit ("PDU"). To bind to SMTP, the HTTP message may be contained in the email body. Examples are illustrated below in greater detail.

Security

Security is an important issue in hosting web services on mobile phones because the open access to resources on the phone may be misused by malicious clients. It is typical to deploy layered security mechanisms from protocol up to applications such that a breach at a lower level can be defended by the layer above. Here, security mechanisms at Compact HTTP, transport protocols, services and applications are employed, as described below in greater detail.

Secure Messages

In mobile environments, a HTTP message may travel through different networks in different protocols. Therefore, it is desirable to employ end-to-end message level security. A symmetric key based security protocol may be used to set up security contexts between two parties.

A design goal is to allow a user who operates the phone to quickly grant and reject clients and service requests. Symmetric key is chosen because our applications are aimed at trusted users who can exchange secret keys easily. For example, the phone and the client may be managed by the same user.

For convenience, the user that configures the phone is referred to as "operator" and the user that configures the application is referred as "director." The protocol includes the following steps:

1) The operator and director agree upon a secret passphrase P and enter it into the phone and the client respectively.

2) The director creates an access token T1 and tells it to the operator.

3) The operator enters client's URI A and T1 into the phone and creates an access token T2. The token is sent by a "join" message encrypted by P to URI A as follows:

```
PUT operators/{phone} HTTP/1.1c
Authorization: T1
x-tid: {number}
token=T2
```

4) The client decrypts the message with P, store T2 and sends an encrypted response message that indicates acceptance.

5) The phone receives and decrypts the response and activates the security context, which contains (A, P, T1, T2).

6) Any subsequent message from the client to the phone will contain T2 and be encrypted with P. The phone will decrypt any message from A with P and checks it against T2. Any response message to A will contain T1 and be encrypted with P.

7) The operator deactivates the security context by sending a "Delete" message to the client. The corresponding security context becomes invalid on the phone and client. An example of a "Delete" message is:

```
DELETE operators/{phone} HTTP/1.1c
Authorization: T1
x-tid: {number}
```

FIG. 2 illustrates the phone interface for the operator to carry out steps 3-5 and step 7.

Secure Services and Data

Because a mobile phone that hosts REST services is also used for other purposes, the operator can start and stop services, login and out of transport services, as ways to control access to the services.

Embodiments in accordance with the present invention may use one or more methods to further limit message exchange patterns for security reasons. First, the respond messages may always be sent back to the requester on the same transport protocol, which had been authenticated and authorized. Second, there is only one subscription for each resource and the event listener must be the same as the subscriber, who has been authenticated and authorized.

Embodiments in accordance with the present invention also secure access to sensitive data collected by the services, such as captured images and videos, by restricting storage of the sensitive data. For example, instead of returning the content to the authenticated client directly, the system stores it locally or stores it in a web storage site and provides a link to the client, who can retrieve it with another set of credentials.

Prototype System

Figure 3:
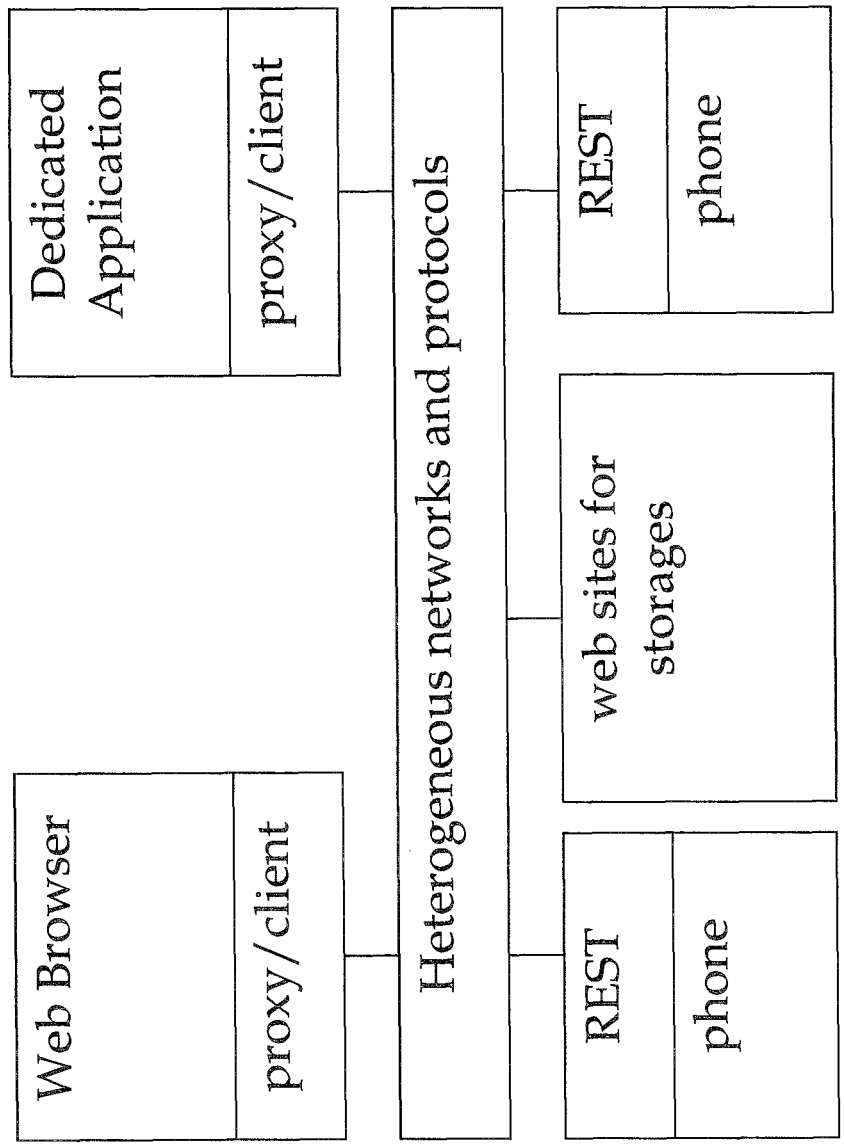
FIG. 3 illustrates high level relations between client applications and REST services on the phones, in accordance with an embodiment of the present invention.

Based on the protocols described above, a prototype system embodiment in accordance with the present invention has been developed that hosts a set of REST resources on T-Mobile G1 phones running Android 1.6 in T-Mobile cellular network. FIG. 3 illustrates relationships of the prototype system between various client applications and the phones, in which REST services are accessible to clients of different kinds over the heterogeneous networks.

Figure 4:
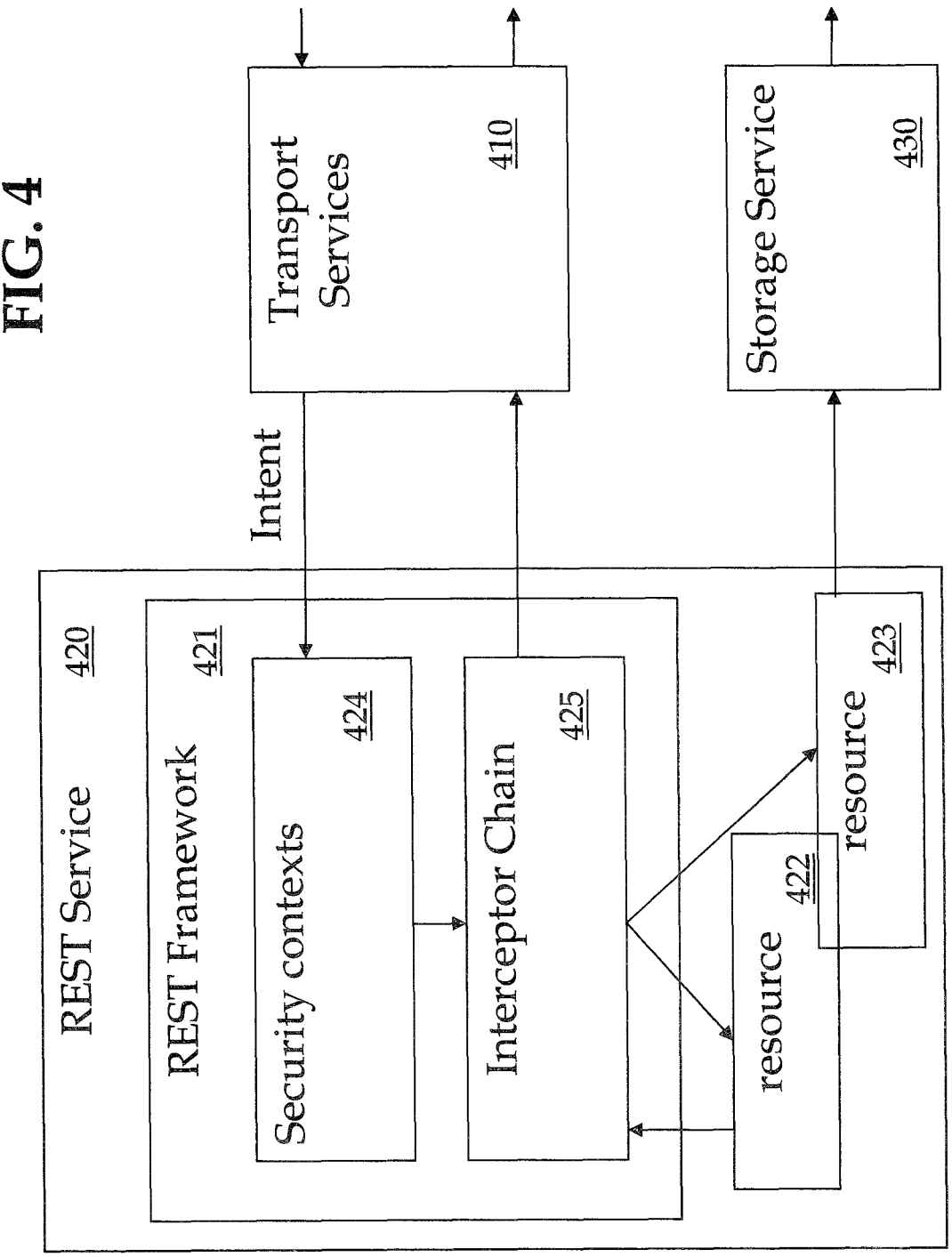
FIG. 4 illustrates a high level architecture of REST service framework on Android phone, in accordance with an embodiment of the present invention.

FIG. 4 illustrates a high-level REST server architecture on an Android phone. There are three types of Android services in the framework: transport services 410, REST services 420 and storage service 430. The Android services may comprise components developed from the Android software development kit ("SDK") and the Java SDK. Typically, transport services 410 and a portion of REST services 420 not within REST framework 421 are developed from the Android SDK, whereas storage services 430 are developed from the Java SDK. The core REST framework 421, including the security package 424, also is not developed from an Android packages and can be run in any Java runtime. REST framework 421 may rely upon at least one resource 422 that is developed from the Java SDK and at least one resource 423 that is developed from the Android SDK.

Transport services 410 are responsible for listening and sending messages over a transport protocol, such as SMS or XMPP. For XMPP transport, we used a XMPP client library compiled for Android. For SMS, we used Android SmsManager. If an incoming message is intended for the REST Service 420, it is forwarded to the REST Service 420 as an Intent on Android platform.

The REST Service 420 is an Android Service that contains the REST framework 421. Upon starting, the REST Service 420 registers an Intent Listener. Upon receiving a message encapsulated in the Intent, the Intent Listener looks up the security context 424 for the message and invokes the interceptor chain 425 in the REST framework 421 to process the message.

Interceptor chain 425, within REST framework 421, contains an incoming interceptor chain, a pivot, and an outgoing interceptor chain. The incoming chain comprises three interceptors to 1) decrypt; 2) de-serialize; and 3) authorize the message.

If any of these interceptors fails, the message is discarded and an error message is returned. If the message is a request, the pivot will invoke the corresponding resource 422 or 423; if the message is a response, the pivot forwards it to the Android Notification Service. The outgoing chain comprises four interceptors to 1) endorse; 2) serialize; 3) encrypt; and 4) deliver the responses. The chains can also be invoked by a resource 422 or 423 to control another resource 422 or 423. For example, a scheduler resource controls the camera by going through the same incoming chain for security reasons.

For message encryption and token generation, we used Java Crypto packages (javax.crypto and java.security) with password based encryption algorithm "PBEWithMD5AndDES." The encrypted messages are encoded as Base64 strings for transmission.

Figure 5:
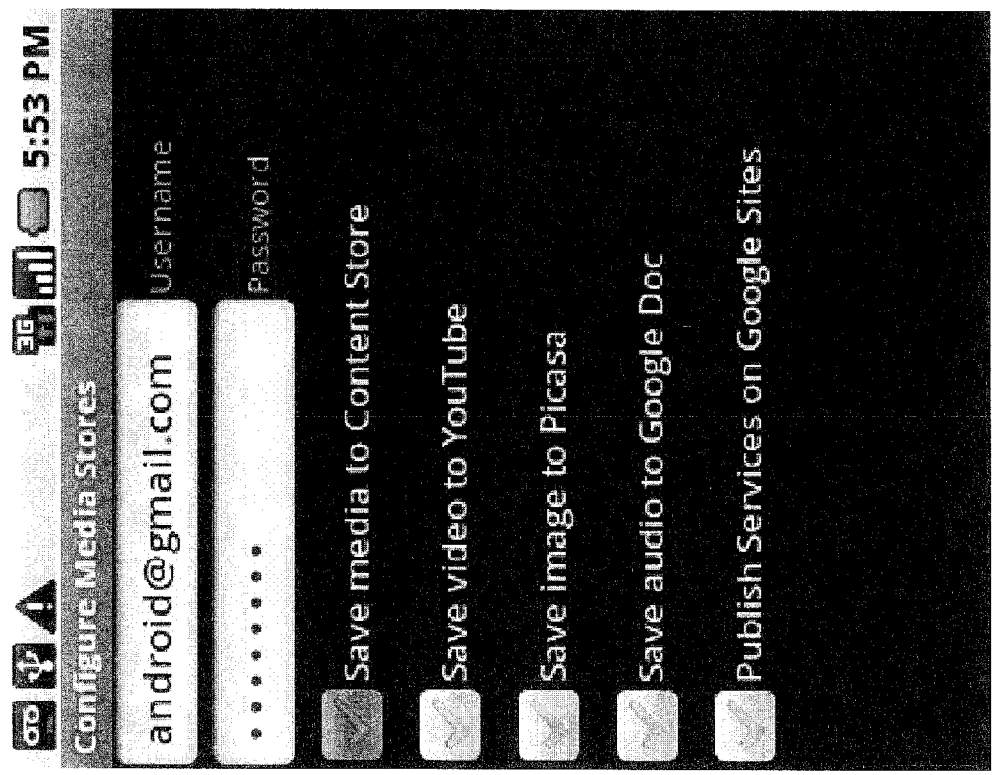
FIG. 5 illustrates a screenshot of web storage activity, in accordance with an embodiment of the present invention.

The REST resources in our approach can use web storages provided by Google to upload captured audio (Google Docs), image (Picasa) and video (YouTube) contents, so that they can be instantly shared for collaboration. The storage service is an abstraction of local and web storages with three methods: login(account), logout( ) and save(uri, content). It uses a set of HTTP clients to upload multimedia contents to the designated server and publish the services to a web proxy (e.g. Google Sites). The phone interface to manage web storage is illustrated in FIG. 5.

Implemented Resources

Table 1 lists the major resources developed within our collaborative endpoint network framework. Each resource is described by one table that defines its path, service, operations and response patterns, where "a" stands for atomic or "m" stands for multi-step.

TABLE 1

Implemented resources:

| | | |
|---|---|---|
| path | /sound/control | |
| GET | Retrieve current state. | a |
| PUT | Record or playback sound. | m |
| path | /camera/control | |
| GET | Retrieve current state. | a |
| PUT | Take or display a picture. | m |
| Path | /camcorder/control | |
| GET | Retrieve current state. | |
| PUT | Record or playback video. | |
| Path | /location,/power | |
| GET | Get current geo location or battery power status. | a |
| Path | /{source}/monitor, where {source} is one of gyroscope, light, location, magnet, motion, orientation, pressure, proximity, temperature, phone, and power. | |
| GET | Get current subscription | a |
| PUT | Subscribe for events from {source}. | a |
| DELETE | Unsubscribe events. | a |
| path | /schedule | |
| POST | Schedule a task in future. For example, start and stop camcorder at given time. | a |

Implemented Clients

Two types of clients were implemented: the Android phone (both client and service) and a dedicated Java desktop client. The Android phone client can control and monitor other Android phones running REST services using HTTP over SMS or XMPP. The Java client, based on open source Smack 3.1.0 XMPP library (Smack API 3.1.0), controls and monitors REST services using HTTP over XMPP only.

Experimental Results

Performance of the REST based collaborative endpoint network framework is a consideration. On the server side, we measured the total processing time (from entering the incoming chain to leaving the outgoing chain) as well as the processing time of individual interceptors. On the client side, we measured the round-trip latency (which includes the network latency and XMPP library processing time). To obtain the time, we used the XMPP java client on a desktop computer (Dual Core CPU 3.00 GHz with 2 GB RAM) connected to the Internet to send 52 HTTP messages over XMPP to each REST service on a T-Mobile HTC G1 phone (Firmware 1.6, Build DMD64) registered in T-Mobile cellular network. The measurements on the phone were collected using Android TimeLogger utility and on our Java desktop client using Java System.nanoTime function. The time performances are summarized in Table 2 and the message sizes are listed in Table 3. (ms):

TABLE 2

Total client time, total server time and individual interceptor times

| Process | mean | std | min | Max |
| --- | --- | --- | --- | --- |
| Client | 1400.6 | 821.7 | 554.3 | 3858.3 |
| Server | 209.53 | 86.08 | 135 | 590 |
| Encrypt | 66.05 | 25.5 | 47 | 153 |
| Decrypt | 39.12 | 19.49 | 2 | 84 |
| Deserialize | 23.98 | 25.1 | 2 | 196 |
| Serialize | 7.4 | 7.3 | 4 | 41 |
| Authorize | 1.77 | 0.53 | 1 | 3 |
| Endorse | 2.4 | 3.03 | 1 | 24 |
| Pivot | 40.33 | 58.98 | 4 | 254 |
| Deliver | 28.42 | 3.8 | 20 | 47 |

TABLE 3

Message Sizes (byte):

| Type | mean | std | min | max |
| --- | --- | --- | --- | --- |
| Encrypted | 113.36 | 28.6 | 88 | 192 |
| Decrypted | 77.93 | 21.54 | 56 | 138 |

Figure 6:
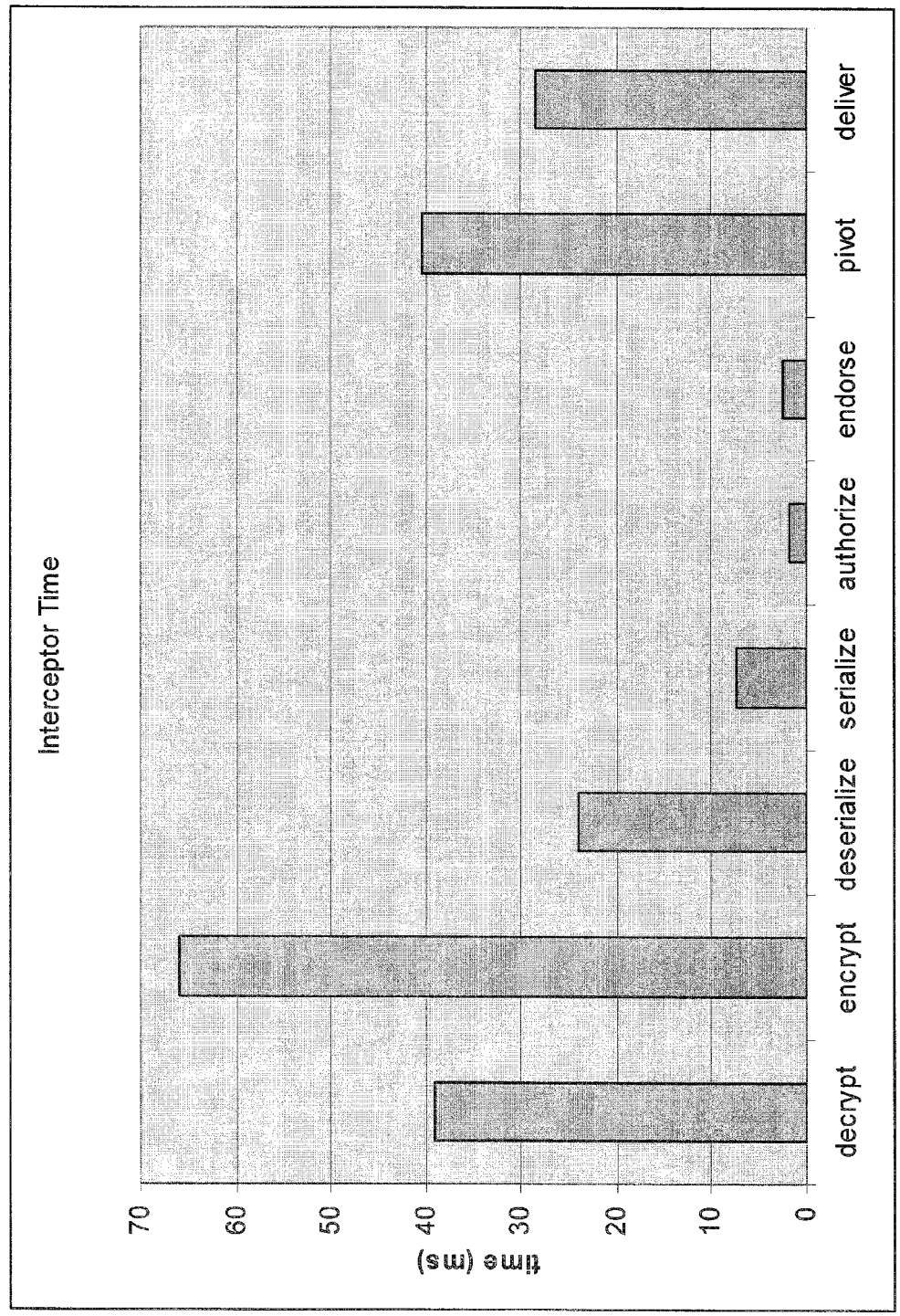
FIG. 6 illustrates a comparison of mean interceptor times, in accordance with an embodiment of the present invention.

FIG. 6 illustrates the mean times spent in the interceptors. The graph shows that, on average, encryption, decryption and pivot are the top three time consuming components, taking up approximately 69% of total server time. Notice that the pivot time is the mean time spent by the resources to execute HTTP methods, which is outside the control of the framework. Table 3 shows that relatively small messages are sufficient to support a variety of basic services such as those referred to in Table 1.

Review

Embodiments in accordance with the present invention have proposed and developed a lightweight protocol, Compact HTTP, that includes a relatively small subset of HTTP 1.1, to address message exchange patterns to enable collaborative endpoint network of mobile phones and related applications. Compact HTTP has been used to develop a REST based framework to handle multi-step interactions, including event subscription and notification. A description of how to bind HTTP to XMPP and SMS for collaborative mobile phone endpoint network has been presented.

Embodiments in accordance with the present invention provide hyperlink presence when communicating with HTTP over XMPP. Further embodiments provided an approach and implemented a solution based on the hyperlink presence in collaborative mobile phone endpoint network to address the broken link problem.

Embodiments in accordance with the present invention provide a symmetric key based security protocol in collaborative mobile phone endpoint network to provide end-to-end message level security for service authentication and authorization. A prototype system has been developed that allows enterprise clients to control and monitor over a dozen of REST resources on a T-Mobile G1 phone. Experimental studies have been performed and the results demonstrated at least that the proposed approaches and architecture are feasible, efficient, and extensible.

Embodiments Providing Http Over XMPP

HTTP 1.1 messages are transported over the TCP/IP protocol in a layered client-server architecture. In order to communicate using this architecture, a HTTP origin server should first have an IP address and a port that are known to and reachable by the clients. A HTTP client then initiates a TCP/IP connection to the known IP address and port, over which the request and response messages will be transported. This procedure takes place for Server-Sent Events and WebSocket as well, in which the servers can push events to a client after the client initiate a HTTP request.

XMPP, described by IETF document numbers RFC-3920 and RFC-3921, is an XML-based messaging protocol to transport instant messages and presence in near real-time in an XMPP network. An XMPP network includes XMPP clients and XMPP servers connected using TCP/IP. Clients connected to the same and different servers client can exchange messages (e.g., XMPP stanzas), creating a logical peer-to-peer network of clients. Each XMPP entity (client or server) is addressed by a special form of URI called Jabber ID (JID). To connect to an XMPP server, a user uses an XMPP client to login to the server with his JID and password. During the login, the XMPP client establishes two XMPP streams with the server over which the XMPP stanzas can be sent and received. Besides one-to-one messages between users, one-to-many messages can also be sent to all users in a chat room. To disconnect from the XMPP server, a user can logout the server or exit the client.

XMPP has been extended to support other features. Jabber RPC, as described by XMPP Standards Foundation document XEP-0009, and SOAP over XMPP, as described by XMPP Standards Foundation document XEP-0072, are two extensions to allow one XMPP entity to invoke services on an entity supporting a different protocol. XHTML-IM, as described by XMPP Standards Foundation document XEP-0071, allows users to send instant messages in XHTML format. Bidirectional Streams over Synchronous HTTP ("BOSH"), described by XMPP Standards Foundation document XEP-0124, and XMPP over BOSH, as described by XMPP Standards Foundation document XEP-0206, together enable web browsers to connect to XMPP servers over HTTP. XEP-0124 and XEP-0206 together allow for use of consecutive HTTP long polls to emulate bidirectional streams between XMPP entities through a Connection Manager (HTTP/XMPP gateway).

Long polling is a variation of the traditional polling technique and allows emulation of an information push from a server to a client. With long polling, the client requests information from the server in a similar way to a normal poll. However, if the server does not have any information available for the client, instead of sending an empty response, the server holds the request and waits for some information to be available. Whenever a long poll is terminated by a response or timeout, the client immediately initiates another one to maintain the connection. At most two such connections can be maintained by a client.

Link-Local, as described by XMPP Standards Foundation document XEP-0174, allows XMPP clients to communicate directly without a server in a LAN environment. RFC5122 defines IRI/URI syntax for identifying and interacting with XMPP entities in an XMPP network from applications external to the network (e.g. a web browser). For example: xmpp:romeo@example.com is an example of a basic XMPP IRI/URI used for purposes of identifying a node associated with an XMPP server, whereas xmpp://romeo@example.com signals the user agent to login as the JID.

It should be understood that a reference number assigned to a link between structural elements may refer to either the communication path itself or to the message(s) carried by the communication path. Multiple links between a pair of structural elements may refer to multiple communication paths, or may refer to a single communication path that caries multiple messages. The distinction that is intended when describing the embodiment will be apparent from the surrounding text.

Figure 7:
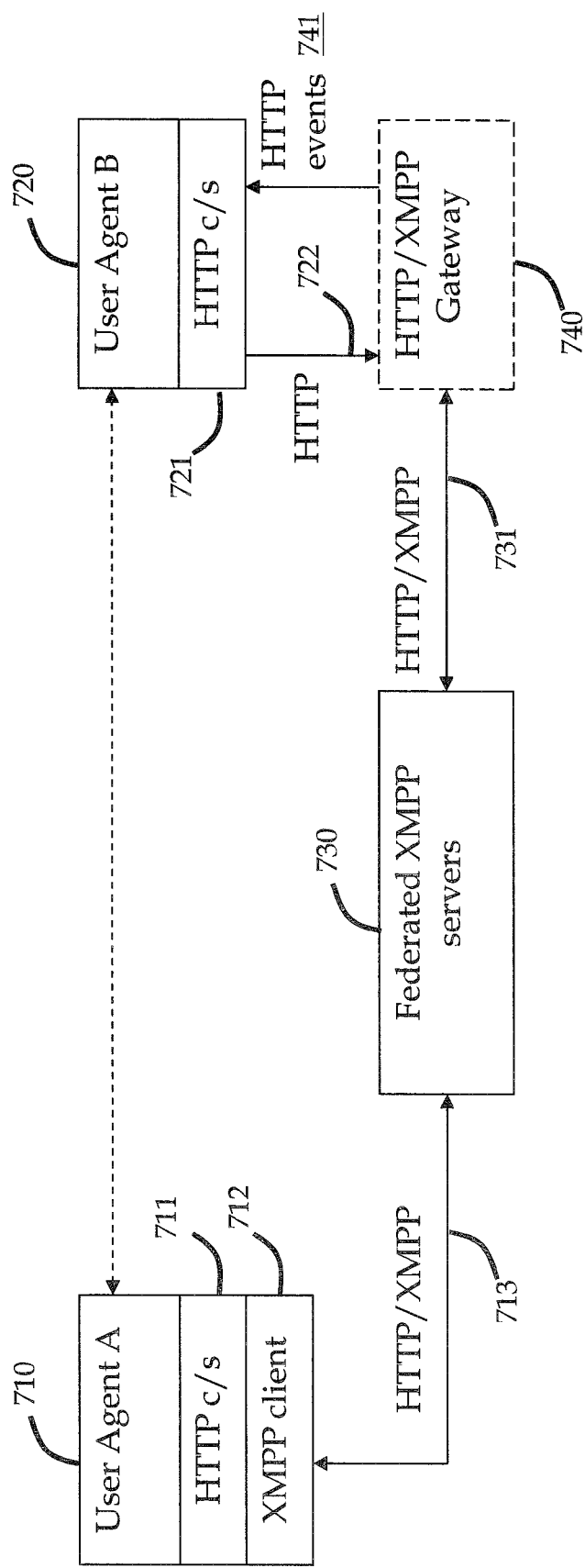
FIG. 7 illustrates an architecture to establish two-way HTTP connections between user agents in a XMPP network using HTTP over XMPP.

FIG. 7 illustrates a method 700 and associated system in accordance with an embodiment of the present invention. Method 700 is useful to establish two-way HTTP connections between peers (e.g., user agents) in an XMPP network using HTTP over XMPP.

HTTP 1.1 can be transported only over TCP/IP. Although the long polling technique discussed above uses the standards described in XEP-0124 and XEP-0206 to transport XMPP over HTTP, there is no standard or practice that defines how to transport HTTP over XMPP.

XMPP networks support service invocations based on XML-RPC and SOAP. However, these are not REST services supported by HTTP as they do not follow the REST architectural constraints (i.e., addressability, connectedness, uniform interface, statelessness, and/or layering). XMPP JID includes an optional resource identifier. But this identifier is to differentiate the login sessions of a user on the same XMPP server. It is different from the concept of a web resource that supports a uniform interface as defined by REST. Although it is possible to use a URI to identify XMPP entities and the interactions with them, these URIs are one-level with one protocol scheme, namely XMPP. Therefore, the corresponding interactions do not involve the HTTP protocol. In summary, current XMPP protocols and networks do not expose web resources that can be manipulated by HTTP.

Embodiments in accordance with the present invention bind HTTP to XMPP to combine the advantages of both protocols without inventing a new one. To realize these embodiments, an XMPP entity in an XMPP network can be a HTTP server, a HTTP client, or both. An XMPP entity can host a number of web resources that can be identified by URI and accessed through a uniform interface (i.e. HTTP GET, PUT, POST and DELETE).

Components of an embodiment of a general architecture 700 in accordance with the present invention are illustrated in FIG. 7. A First User Agent 710 (also referred to herein as User Agent A 710) wishes to communicate with a Second User Agent 720 (also referred to herein as User Agent B 720). User Agent A 710 may include an HTTP client and/or server 711 and an XMPP client 712. User Agent A 710 and/or User Agent B 720 may be, for instance, a mobile device. User Agent B 720 includes an HTTP client and/or server 721, but no XMPP client. Architecture 700 may further comprises an optional HTTP/XMPP Gateway 740 in communication contact with User Agent B 720 via HTTP interface 722 to receive communication from User Agent B 720, and via an HTTP events interface 741 to send HTTP events to User Agent B 720. Interfaces 722 and 741 may comprise separate unidirectional interfaces as shown in FIG. 7, or may comprise a bidirectional interface. Separate interfaces 722 and 741 may be used to indicate there are two logical flows of messages: one of request/response and the other of events. These two logical flows can be realized by two TCP connections where the request/response flow is separated from the event stream. It can also be realized by on TCP connection, like WebSocket. Architecture 700 further comprises at least one federated XMPP server 730 which is in communication contact with both the HTTP/XMPP Gateway 740 (via bidirectional interface 731) and User Agent A 710 (via bidirectional interface 713). Optionally, interface 713 and/or 731 may respectively comprise separate unidirectional interfaces rather than a bidirectional interface.

There are two methods for User Agent A 710 to connect with User Agent B 720 using HTTP-over-XMPP: (A) by use of a local XMPP library (e.g., JavaScript or a browser component); (B) by use of a HTTP/XMPP gateway 740. Either method establishes a logical HTTP connection between the two HTTP peers. A system can comprise an arbitrary number of peers connected using either method (A) or method (B).

Embodiments in accordance with the present invention comprise:

A) A two-level URI template to identify web resources accessible by use of HTTP in an XMPP network;

B) A resolution mechanism to dereference the two-level URI, e.g., by any user agent that acts as an HTTP client;

C) A binding of HTTP to XMPP, e.g., by a user that acts as an HTTP client and/or server;

Part A: URI Template

Suppose an XMPP entity is addressed by a JID: [node "@"] domain ["/" resource], then a web resource in this entity accessible through HTTP is identified by the following template, where the extra slash (/) is used if {jid} contains a resource part:

http://xmpp:{jid}/[/][?<path>] [?<query>] [#<fragment>]

where {jid} is defined by XMPP and the components in angle brackets are defined by a URI having a generic syntax given by RFC3986. Here is an example URI that identifies a camera resource in an XMPP entity "romeo@example.com/server":

http://xmpp:romeo@example.com/server//media/camera

Part B: URI Resolution

Given a two-level URI as defined above, a user agent that has been authenticated as "juliet@example.com/client" can dereference the URI by use of an XMPP stanza as shown below, such as by use of an Info/Query ("IQ") stanza marked by a tag pair "<iq . . . >" and "</iq>".

1) Extract from the two-level URI the JID between "xmpp:" and the proper delimiter "//" or "/", e.g. romeo@example.com/server, to form the HTTP Host header field;

2) Extract the from the two-level URI the location following the proper delimiter "//" or "/", e.g. "/media/camera", which is then assigned to the HTTP Request-URI field;

3) Activating an XMPP connection, either by selecting a previously established XMPP connection, or by prompting a user to login to an XMPP server if there is no previously established XMPP connection;

4) Send an XMPP IQ stanza to the JID (extracted at step 1) which contains a HTTP GET message to the URI location, as illustrated below:

```
<iq id="1" type="get" from="juliet@example.com/client"
to="romeo@example.com/server">
    <http><![CDATA[
    GET /media/camera HTTP 1.1
    Host: romeo@example.com/server
    Accept: text/html
    ]]></http>
</iq>
``` and extract the response from the result IQ stanza as illustrated below:

```
<iq id="1" type="result" to="juliet@example.com/client"
from="romeo@example.com/server">
    <http><![CDATA[
    HTTP 1.1 200 OK
    Content-Type: text/html
    <html>
    ...
    </html>
    ]]></http>
</iq>
```

Part C: HTTP Over XMPP

To determine if a responding XMPP entity supports HTTP, a requesting entity can send a Service Discovery stanza, as described in XEP-0030, to the responding entity, querying for the protocol(s) supported by the responding XMPP entity, and an entry point URI:

```
<iq from='juliet@example.com/client'
    to='romeo@example.com/server' id='1' type='get'>
    <query xmlns='http://jabber.org/protocol/disco#info'/>
    <query xmlns='http://jabber.org/protocol/disco#items'/>
</iq>
```

If the responding XMPP entity supports HTTP, it sends a response stanza including the supported HTTP feature and the entry point URI to the REST services:

```
<iq from='romeo@example.com/server' to=juliet@example.com/client'
id='1' type='result'>
    <query xmlns='http://jabber.org/protocol/disco#info'>
        <identity category='automation' type='http'/>
        <feature var='http://jabber.org/protocol/http'/>
    </query>
    <query xmlns='http://jabber.org/protocol/disco#items'>
        <item node='http://romeo@example.com/server//media'
name='Romeo Media Service' />
    </query>
</iq>
```

Once the HTTP feature and entry point URI are found in the response, the requesting entity sends a HTTP GET to the entry point URI as described in Part B and follow the returned hypertext to invoke the REST services.

HTTP can be bound to either XMPP <iq> or <message> stanzas. <iq> requests are for immediate response whereas <message> requests can be stored and forwarded when the responding entity is connected. The general HTTP over XMPP binding rules are summarized below:

1) HTTP GET is bound to <iq type="get"> or <message type="chat|groupchat|normal"> stanzas;

2) HTTP PUT, POST and DELETE are bound to <iq type="set"> or <message type="chat|groupchat|normal"> stanzas;

3) HTTP response codes 1xx-3xx are bound to <iq type="result"> or <message type="chat|groupchat|normal"> stanzas; and 4) HTTP response codes 4xx-5xx are bound to <iq type="error"> or <message type="error"> stanzas.

All XMPP stanzas should include the id attribute so that asynchronous HTTP responses can be correlated to the requests. When bound to XMPP, HTTP messages are subject to proper transfer encoding to satisfy the constraints enforced by the gateways and servers.

Embodiments in accordance with the present invention bind HTTP with XMPP, allowing transport of HTTP over XMPP. This binding creates a new peer-to-peer REST service framework that is different from the client-server architecture. The advantages of this approach are the union of REST and XMPP:

1) Enable REST service on endpoints (e.g., mobile devices) that are without a public IP address;

2) Enable peer-to-peer REST services such that any user agent can initiate HTTP requests;

3) Support asynchronous message using XMPP built-in message correlation without any change to XMPP or HTTP semantics;

4) Support near real-time REST services offered by XMPP implementations;

5) Add one-to-many HTTP message exchange pattern using XMPP groupchat feature;

6) Use XMPP presence to avoid broken hyperlinks to web resources in an XMPP network;

7) Support serverless configuration in LAN using XMPP Link-Local (no gateway option); and 8) Support gateway and local caches to speed up REST services.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the present invention to the precise form disclosed. Modifications and variations are possible in light of the above teachings or may be acquired from practice of the present invention.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method to transport HTTP over XMPP, comprising:
forming a first two-level URI template to identify web resources accessible by use of HTTP in an XMPP network, wherein a first level is XMPP-formatted and a second level is HTTP-formatted;
binding HTTP to first XMPP <message> and <iq> stanzas, wherein binding HTTP to first XMPP <message> and <iq> stanzas comprises:
binding HTTP GET to an XMPP <iq type="get"> stanza;
binding HTTP PUT, POST and DELETE to an XMPP <iq type="set"> stanza;
binding HTTP response codes 1xx-3xx to an XMPP <iq type="result"> stanza; and
binding HTTP response codes 4xx-5xx to an XMPP <iq type="error"> stanza;
transmitting the first XMPP <message> and <iq> stanzas;
receiving a HTTP message in received <message> and <iq> stanzas; and
discovering, by use of an XMPP mechanism, whether an XMPP entity supports transport of HTTP over XMPP.

2. The method of claim 1, wherein the first XMPP <message> and <iq> stanzas are sent to an HTTP/XMPP gateway.

3. The method of claim 1, wherein transmitting the first XMPP <message> and <iq> stanzas is by use of an XMPP process library.

4. The method of claim 1, wherein discovering whether the XMPP entity supports the transport of HTTP over XMPP comprises:
extracting an XMPP JID from a second two-level URI template;
assigning the XMPP JID to a HTTP Host header field;
extracting a HTTP Request-URI field from a portion of the second two-level URI template following a predetermined delimiter;
activating an XMPP connection;
transmitting a second XMPP <iq> stanza to a destination indicated by the JID, wherein the second XMPP <iq> stanza comprises a HTTP GET message to a URI location indicated by the HTTP Request-URI;
receiving a result <iq> stanza from the destination indicated by the JID; and
extracting a response from the result <iq> stanza.

5. The method of claim 4, further comprising:
transmitting an XMPP service discovery stanza to the destination indicated by the JID, wherein the XMPP service discovery stanza comprises at least one of a query of supported protocols and a query of an entry point URI.

6. The method of claim 4, wherein activating the XMPP connection comprises selecting a previously established XMPP connection.

7. The method of claim 4, wherein activating the XMPP connection comprises prompting a user to log in to an XMPP server.

8. The method of claim 7, further comprising:
receiving a response to the XMPP service discovery stanza; and
invoking REST services at the entry point URI.

9. A method to transport HTTP over XMPP, comprising:
forming a first two-level URI template to identify web resources accessible by use of HTTP in an XMPP network, wherein a first level is XMPP-formatted and a second level is HTTP-formatted;
binding HTTP to first XMPP <message> and <iq> stanzas, wherein binding HTTP to first XMPP <message> and <iq> stanzas comprises:
binding HTTP GET to an XMPP <message type="chat|groupchat|normal"> stanza;
binding HTTP PUT, POST and DELETE to an XMPP <message type="chat|groupchat|normal"> stanza;
binding HTTP response codes 1xx-3xx to an XMPP <message type="chat|groupchat|normal"> stanza; and
binding HTTP response codes 4xx-5xx to an XMPP <message type="error"> stanza;
transmitting the first XMPP <message> and <iq> stanzas;
receiving a HTTP message in received <message> and <iq> stanzas; and
discovering, by use of an XMPP mechanism, whether an XMPP entity supports transport of HTTP over XMPP.

10. The method of claim 9, wherein the first XMPP <message> and <iq> stanzas are sent to an HTTP/XMPP gateway.

11. The method of claim 9, wherein transmitting the first XMPP <message> and <iq> stanzas is by use of an XMPP process library.

12. The method of claim 9, wherein discovering whether the XMPP entity supports the transport of HTTP over XMPP comprises:
extracting an XMPP JID from a second two-level URI template;
assigning the XMPP JID to a HTTP Host header field;
extracting a HTTP Request-URI field from a portion of the second two-level URI template following a predetermined delimiter;
activating an XMPP connection;
transmitting a second XMPP <iq> stanza to a destination indicated by the JID, wherein the second XMPP <iq> stanza comprises a HTTP GET message to a URI location indicated by the HTTP Request-URI;
receiving a result <iq> stanza from the destination indicated by the JID; and
extracting a response from the result <iq> stanza.

13. The method of claim 12, further comprising:
transmitting an XMPP service discovery stanza to the destination indicated by the JID, wherein the XMPP service discovery stanza comprises at least one of a query of supported protocols and a query of an entry point URI.

14. The method of claim 12, wherein activating the XMPP connection comprises selecting a previously established XMPP connection.

15. The method of claim 12, wherein activating the XMPP connection comprises prompting a user to log in to an XMPP server.

16. The method of claim 13, further comprising:
receiving a response to the XMPP service discovery stanza; and
invoking REST services at the entry point URI.

17. A method to transport HTTP over XMPP, comprising:
forming a first two-level URI template to identify web resources accessible by use of HTTP in an XMPP network, wherein a first level is XMPP-formatted and a second level is HTTP-formatted;
binding HTTP to first XMPP <message> and <iq> stanzas;
transmitting the first XMPP <message> and <iq> stanzas;
receiving a HTTP message in received <message> and <iq> stanzas; and discovering, by use of an XMPP mechanism, whether an XMPP entity supports transport of HTTP over XMPP, wherein discovering whether the XMPP entity supports the transport of HTTP over XMPP comprises:
- extracting an XMPP JID from a second two-level URI template;
- assigning the XMPP JID to a HTTP Host header field;
- extracting a HTTP Request-URI field from a portion of the second two-level URI template following a predetermined delimiter;
- activating an XMPP connection;
- transmitting a second XMPP <iq> stanza to a destination indicated by the JID, wherein the second XMPP <iq> stanza comprises a HTTP GET message to a URI location indicated by the HTTP Request-URI;
- receiving a result IQ stanza from the destination indicated by the JID; and
- extracting a response from the result <iq> stanza.

18. The method of claim 17, wherein the first XMPP <message> and <iq> stanzas are sent to an HTTP/XMPP gateway.

19. The method of claim 17, wherein transmitting the first XMPP <message> and <iq> stanzas is by use of an XMPP process library.

20. The method of claim 17, wherein activating the XMPP connection comprises selecting a previously established XMPP connection.

21. The method of claim 17, wherein activating the XMPP connection comprises prompting a user to log in to an XMPP server.

22. The method of claim 17, further comprising:
transmitting an XMPP service discovery stanza to the destination indicated by the JID, wherein the XMPP service discovery stanza comprises at least one of a query of supported protocols and a query of an entry point URI.

23. The method of claim 17, wherein binding HTTP to first XMPP <message> and <iq> stanzas comprises:
- binding HTTP GET to an XMPP <iq type="get"> stanza;
- binding HTTP PUT, POST and DELETE to an XMPP <iq type="set"> stanza;
- binding HTTP response codes 1xx-3xx to an XMPP <iq type="result"> stanza; and
- binding HTTP response codes 4xx-5xx to an XMPP <iq type="error"> stanza.

24. The method of claim 17, wherein binding HTTP to first XMPP <message> and <iq> stanza comprises:
- binding HTTP GET to an XMPP <message type="chat|groupchat|normal"> stanza;
- binding HTTP PUT, POST and DELETE to an XMPP <message type="chat|groupchat|normal"> stanza;
- binding HTTP response codes 1xx-3xx to an XMPP <message type="chat|groupchat|normal"> stanza; and
- binding HTTP response codes 4xx-5xx to an XMPP <message type="error"> stanza.

25. The method of claim 22, further comprising:
receiving a response to the XMPP service discovery stanza; and
invoking REST services at the entry point URI.

* * * * *